United States Patent [19]

Centore

[11] Patent Number: 4,680,852

[45] Date of Patent: Jul. 21, 1987

[54] ROUND ELECTRICAL CABLE ADAPTING TOOL

[76] Inventor: Anthony Centore, R.D. #5, Amsterdam, N.Y. 12010

[21] Appl. No.: 878,612

[22] Filed: Jun. 26, 1986

[51] Int. Cl.[4] ........................ H01R 43/28; B23P 19/00

[52] U.S. Cl. ........................................ 29/461; 29/466; 29/566.3; 29/757; 29/868; 269/903

[58] Field of Search .............. 29/755, 757, 758, 566.1, 29/566.3, 566.4, 33 M, 461, 465, 748, 753, 466-468, 868, 871; 140/139, 140, 147; 269/903

[56] References Cited

U.S. PATENT DOCUMENTS

| | | | |
|---|---|---|---|
| 3,936,933 | 2/1976 | Folk et al. | 29/755 X |
| 3,953,925 | 5/1976 | Wilson | 29/566.3 X |
| 3,987,531 | 10/1976 | Tucci | 29/748 |
| 4,047,294 | 9/1977 | Quigley | 29/753 X |
| 4,123,137 | 10/1978 | Marcatili | 350/96.21 |
| 4,132,252 | 1/1979 | Shatto, Jr. | 140/147 |
| 4,144,633 | 3/1979 | Tucci | 29/566.3 |
| 4,174,560 | 11/1979 | Senior | 29/566.1 |
| 4,180,904 | 1/1980 | Nijman | 29/749 |
| 4,184,244 | 1/1980 | Kaczmarek | 29/566.3 |
| 4,192,177 | 3/1980 | Fitzgerald | 29/56.6 |
| 4,210,997 | 7/1980 | Holt | 29/566.3 |
| 4,219,913 | 9/1980 | Johnson, Jr. | 29/33 |
| 4,282,644 | 8/1981 | Petree | 29/566.3 |
| 4,318,215 | 3/1982 | Holt | 29/566.3 |
| 4,335,497 | 6/1982 | Casey | 29/566.2 |
| 4,349,944 | 9/1982 | Fickes | 29/566.4 |
| 4,527,328 | 7/1985 | Moody et al. | 29/749 |
| 4,529,266 | 7/1985 | Delebecque | 29/868 X |

*Primary Examiner*—Gil Weidenfeld
*Assistant Examiner*—Steven C. Bishop
*Attorney, Agent, or Firm*—Heslin & Rothenberg

[57] ABSTRACT

The multiple strands of a multi-strand round wire electric cable are stretched over a frame to form a grid of closely spaced parallel strands. The strands are simultaneously cut off so that the strand ends are coplanar and the grid is pressed on a strip of pressure sensitive tape to retain the strands in the grid pattern which is similar to the individual strands in a flat electrical cable. The grid is released from the frame and terminated as a flat electrical cable.

20 Claims, 6 Drawing Figures

ROUND ELECTRICAL CABLE ADAPTING TOOL

BACKGROUND OF THE INVENTION

1. Field of the Invention

This invention relates to a round electrical cable adapting tool and more particularly to a hand tool for adapting the multiple, individual, conductor strands of round electrical cable to a multiple, individual conductor strand, flat electrical cable for termination thereof, i.e. for electrical connection of each individual conductor strand in an electrical cable to an electrical contact in an electrical connector.

2. Definitions

A. A round electrical cable comprises a plurality of individual conductor strands of a metal such as copper wire coated or sheathed with a resin material such as polyethylene or polypropylene. The individual strands are spirally wound into a round cable configuration which is contained within an electrically insulating sleeve or jacket of an electrically insulating material such as a solid resin material or an electrically insulating woven or fabric like material which is impregnated with an electrically insulating material such as a thermosetting resin. An individual conductor strand as described may have a solid copper wire core, or the core may be made up of a plurality of very small diameter copper wires which are spirally wound together into a small diameter wire cable, a plurality of which are also wound in spiral form as a larger round wire cable, and subsequently sheathed in an electrically insulating material. In order to electrically connect a round electrical cable to an electrical connection device a separate small tab connector or terminal such as a ring or spade terminal is usually attached by soldering or crimping to a bared copper core end of each conductor strand, and the terminal is then connected to a further contact in the appropriate connector device for the cable. The operation requires excessive time and effort.

B. A flat electrical cable comprises a plurality of individual conductor strands which are positioned in close side by side parallel linear relationship and sandwiched and sealed between two strips of an electrically insulating material. The result is a flat large tape or ribbon-like configuration of parallel side by side individual conductor strands.

3. Description of Prior Art

A wide variety of both hand tools and production tools are available for expeditious termination of a flat cable. Generally these tools comprise a comb-like arrangement of fingers which are spaced apart the same distance as the conductor strands in the flat cable. A connector device includes a plurality of connector terminals which are spaced apart the same distance as are the strands in the flat cable. The flat cable is positioned in the tool so that the fingers can engage each strand. The fingers are moveable as a unit and operation of the tool causes the fingers to engage the strands of the flat cable and simultaneously force the strands into engagement with individual terminals in the connector. These terminals are provided with sharp edges which pierce the insulation on the strands and make electrical contact with the copper core of the strand as well as to mechanically attach itself to the strands. The procedure of connecting a multi-strand conductor or cable to a connector device is referred to as "termination of a cable." A round electrical cable is not as amenable to expeditious termination as is a flat cable and few if any tools are commercially available which will terminate larger round electrical cable.

In the original installation of an electrical cable, for example, into a newly constructed building or from one factory layout to another, the round cable is the stronger cable and is less likely to be damaged when extended lengths of the cable are pulled through walls or conduits in building constructions. Accordingly, a round electrical cable is more easily installed, requires less effort to do so, and also has the advantage of being more economical in original cost. However, a flat cable is more expeditiously terminated and a large variety of hand and production tools are available to do so. A tool which could quickly and expeditiously terminate a round electrical cable would be quite desirable.

OBJECTS OF THE INVENTION

It is an object of this invention to provide an improved hand tool which is effective to adapt a round electrical cable to a flat electrical cable configuration for expeditious termination.

It is another object of this invention to provide a simple and expedient hand tool for adapting a plural strand round electrical cable to a flat electrical cable configuration which lends itself for advantageous termination with presently available flat cable termination tools.

It is a further object of this invention to provide a more advantageous termination procedure for round electrical cables in which the connector attachment thereto may be expeditiously delayed until after the cable is placed in its final, operative position.

It is still another object of this invention to provide for an advantageous substitution of round electrical cable for flat electrical cable while utilizing flat electrical cable terminations and connectors.

SUMMARY OF THE INVENTION

A hand tool is employed to adapt a round electrical cable to a flat electrical cable configuration for termination. The tool includes movable L-shaped members which move towards each other so that the shorter or foot sides of the L-shaped members tend to abut each other in sole to sole relationship. Grooves in the sole sides grip a round electrical cable therebetween so that the cable projects from between the abutting flat surfaces perpendicularly to the plane of the larger sides of the L-shaped members. Rectangular frame or tenter members having two longer parallel sides and two shorter parallel sides are placed on the larger sides of the L-shaped members in stacked relationship. These tenter frame members have an array of closely spaced parallel grooves formed in opposite parallel shorter sides of the tenter frame. The grooves in one such short side are coincident with similar grooves in the opposite short side. Individual conductor strands of the round cable are exposed and stretched across the frame members in the described grooves to span the frame as a grid of conductor strands. L-shaped members are withdrawn from abutting sole to sole relationship and the larger sides of the L-shaped members are stacked together. Rectangular anvil members are inserted in the tool opposite to each other on opposite sides of the grid of strands but within the frame members to abut the grid of conductor strands formed thereon. One anvil is fitted with a cutter blade while the opposite anvil is fitted with a cutter block. The grid of strands is positioned between the blade and the block. The blade shears off the individual conductor strands in the grid in a sharp 90 degree linear cutoff of all strands. Simultaneously a strip of pressure sensitive tape is positioned transversely across the grid of conductor strands at a position spaced from but parallel to the cutter blade and the individual conductor strands are bonded to the tape and to each other in their grid position. The grid of conductor strands is removed from the slots in the frame as a unitary strip bonded with the tape, and then terminated as a flat electrical cable.

This invention will be better understood when taken in connection with the following description and drawings.

Figure 1:
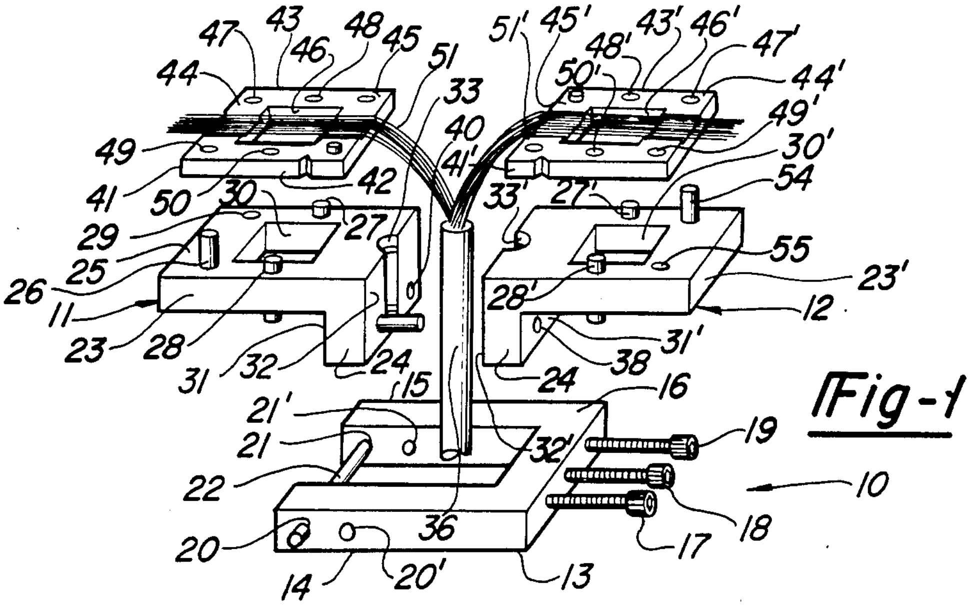
FIG. 1 is an exploded view of a preferred tool for the practice of this invention.

Referring now to the exploded view of FIG. 1, there is illustrated a combination of a clamp member 10 and a pair of holders 11 and 12. Clamp 10 comprises a sturdy and rigid U-shaped member 13 having a pair of spaced parallel longer arms 14 and 15 and a cross arm 16. Cross arm 16 is drilled through and tapped for three equally spaced screws 17, 18 and 19 which reside in the plane of the U-shaped clamp 10 and are parallel to arms 14 and 15. Screws 17, 18 and 19 may be of a well known kind referred to as Allen head screws which are provided with hexagonal recesses in their heads which are adapted to receive an appropriate hexagonal wrench tool therein so that the screws may be conveniently rotated. Screws 17, 18 and 19 are adapted to be threaded into cross arm 16 until they project from arm 16 into the enclosed region of the clamp defined by arms 14, 15 and 16. Arms 14 and 15 at their ends opposite from arm 16 each contain a smooth bore aperture 20 and 21, respectively, which are concentric with each other. A smooth pin member 22 is inserted through one aperture 20 in arm 14 for example, to cross the space between arm 14 and 15 and enter the other aperture 21 in arm 15. Pin member 22 is parallel to arm 16 and perpendicular to arms 14 and 15, and therefore a large rectangular opening is circumscribed by arms 14, 15 and 16 and pin 22. A smaller rectangular opening may be so circumscribed by inserting pin member 22 through a second set of apertures 20' and 21' in arms 14 and 15, respectively. Thus, depending upon the particular use for clamp 10 the rectangular opening size defined by arms 14, 15 and 16 and pin 22 may be varied.

Holders 11 and 12 are right angled or L-shaped members which are near identical in construction so that a description of one also suffices for the other, except where specific differences are noted. L-shaped holder 11 comprises a backplate or leg part 23 and a base or footplate 24. Backplate 23 includes a smooth flat back surface 25 having a plurality of alignment pins 26, 27 and 28 projecting therefrom, and an alignment aperture 29 therethrough. Backplate 23 also includes a large sharp cornered central rectangular aperture 30 extending perpendicularly therethrough.

Figure 2:
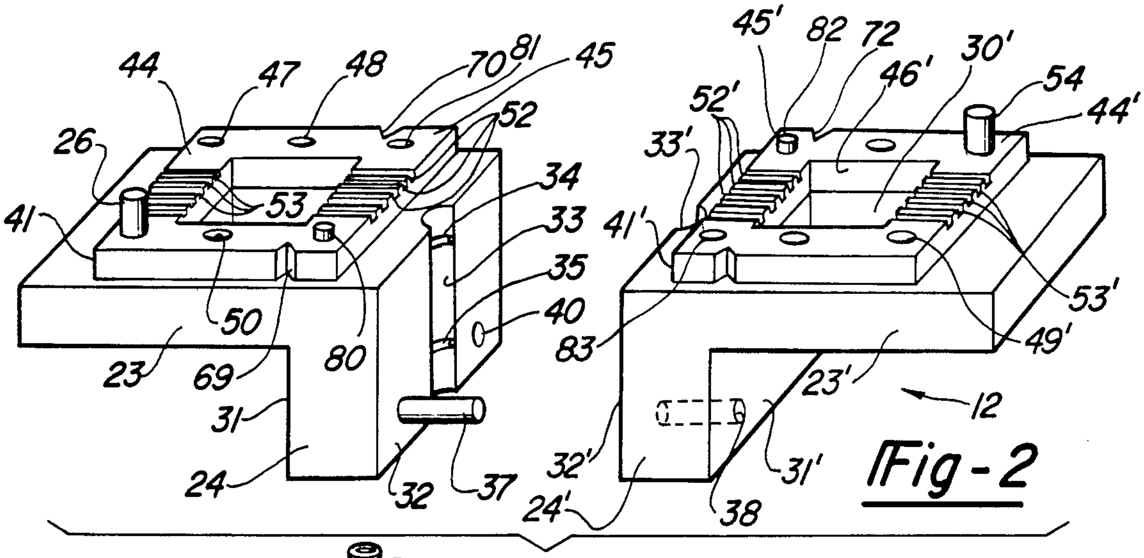
FIG. 2 is an enlarged illustration of a pair of holders utilized in the tool of FIG. 1 together with a pair of rectangular grid or tenter frames on the holders.

As illustrated in FIG. 2, footplate 24 of holder 11 is a rectangular plate section which is perpendicular to one edge of backplate 23 and defines an inner surface 31 and a sole surface 32.

Each footplate 24 and 24' contains a half round groove 33 and 33', respectively, extending across its sole surface and perpendicular to its backplate. If the sole surfaces 32 and 32' are placed in abutting relationship a full circle aperture would be defined by the half grooves 33 and 33'. Each half round groove 33 and 33' has its axis perpendicular to the backplates 23 and 23' and parallel to the axis of the rectangular aperture 30 and 30' in backplate 23 and 23'. Each half groove 33 and 33' also has a pair of raised ribs 34, 35, 34' and 35' therein.

As illustrated in FIG. 1 the footplates 24 and 24' are adapted to be brought into abutting and registering relationship with each other with a round electrical cable 36 fitting in the grooves 33 and 33'. One footplate 24 of holder 11, is provided with an extended alignment pin 37 and the other footplate 24', of holder 12, is provided with a corresponding alignment aperture 38 to receive pin 37. A second similarly cooperating extended pin 39 and aligned aperture 40 is also provided on the footplates.

When the footplates 24 and 24' are brought into abutting relationship, the interfitting of the alignment pins 37 and 39 in the alignment apertures 38 and 40 brings the footplates into exact alignment and registry with the half circle grooves 33 and 33' coinciding with a common axis. The raised ribs 34 and 35 in the grooves 33 and 33' are adapted to engage a round electrical cable, as defined, in a slightly indenting manner to grip the cable tightly between the footplates 24 and 24'.

As shown in FIG. 1, when the footplates 24 and 24' are brought together with the cable 36 therebetween the abutting footplates fit closely in the rectangular opening in clamp 10 defined by arms 14, 15 and 16, and pin 22. Thereafter, turning of screws 17 and 19 will cause the screws to project into the described enclosed region in the clamp 10 and engage the inner surface 31 or 31' of footplates 24 and 24' moving them jointly against pin 22. Further turning will result in ribs 34, 35, 34' and 35' in grooves 33 and 33' indenting further into cable 36 to retain it more tightly in grooves 33 and 33'.

By means of this invention a round electrical cable may be easily adapted to a flat cable configuration for ease in final termination or connection to a connector. Adaptation is accomplished by specifically arranging the individual strands or conductors of a round cable in a longitudinally extending planar parallel, side by side grid relationship and joining the conductors together in the grid configuration.

In the present invention certain grid or tenter frames facilitate this arranging and joining step in the operation. Such grid frames are illustrated in FIGS. 1 and 2.

Referring now to FIG. 1, there is disclosed a pair of grid frames 41 and 41' which are identical so that a description of one suffices for the other. Grid frame 41 is disclosed as a flat surfaced rectangular frame member having a pair of parallel longer side arms 42 and 43, and a pair of shorter parallel side arms 44 and 45. As such, grid frame 41 defines a rectangular opening 46 within the arms as described. Arms 42 and 43 have spaced alignment apertures 47 and 48 and 49 and 50 therein. These apertures are adapted to receive therein pins 26, 27 and 28 from holder 11 and pin 54 from holder 12 when brought in registry with holder 11 (discussed further below) for accurate registration of grid frames 41 and 41' with backplates 23 and 23' of holders 11 and 12. As shown in FIG. 2, arms 45 and 45' have alignment pins 80 and 82, respectively, and alignment apertures 81 and 83, respectively. Alignment aperture 83 is adapted to securely receive therein alignment pin 80 when grid frames 41 and 41' are brought in registry (discussed further below). Similarly, alignment aperture 81 is adapted to securely receive therein alignment pin 82. Grid frames 41 and 41' are adapted to retain a plurality of individual conductor strands 51 and 51' of cable 36 stretched across their rectangular openings 46 and 46' in a close, side by side, parallel, grid manner.

In order to arrange the conductor strands 51 and 51' in the desired grid configuration, a row of closely spaced side by side parallel grooves are provided in the surface of shorter side arms 44, 44', 45 and 45'. Grooves 52 and 52' in side arms 45 and 45' are directly opposite and coaxial with corresponding grooves 53 and 53' in side arms 44 and 44' and across the apertures 46, 46', respectively, therefrom. Grooves 52, 52', 53 and 53' are dimensioned so that they grasp and retain conductor strands 51 and 51' therein.

Referring again to FIG. 1, when holders 11 and 12 are mounted on clamp 10 by having their footplates 24 and 24' inserted in clamp 10 with cable 36 in footplate grooves 33 and 33', cable 36 is ready for adaptation. The ribs 34, 35, 34' and 35' of grooves 33 and 33' closely encircle cable 36 near the point where the outer jacket of cable 36 is cut away to expose the loose conductor strands 51. The operator of the tool of this invention grasps an individual conductor strand 51 and places it coaxially in one of the grooves 52 in one side arm 45, for example, of grid frame 41. The length of the strand is sufficient so that it extends across aperture 46 and is placed in a coaxial and corresponding continuing groove 53 in side arm 44. In one example there are 13 grooves in each short side arm of grid frames 41 and 41'.

The above described "strand in a groove" process is then repeated until all grooves in each grid frame contain a conductor strand. The total number of grooves in the inserts is predicated on the number of individual conductor strands in a predetermined round cable to be adapted. In the present example two grid frames 41 and 41' of 13 grooves each are employed for a 26 strand cable 36. Each groove consists of a groove in one arm of a frame, which is a half groove, and its corresponding and continuing coaxial half groove in the opposite arm. With all grooves occupied by conductor strands there will be 13 strands in each grid frame. For ease in handling there is some excess length of conductor strands in the grid frames 41 and 41' which overlaps a side arm such as 44 of grid frame 41 and side 44' of grid frame 41'. Prior to final adaptation excess lengths of strands 51 and 51' are evenly cut off. At this point, footplates 24 and 24' of holders 11 and 12 may be withdrawn from clamp 10 and separated therefrom. Referring now to FIG. 2, the sole plates 24 and 24' of holders 11 and 12 are withdrawn from the clamp 10, as illustrated, and holders 11 and 12 are laterally disengaged from each other with the alignment pin 37 of holder 11 withdrawn from alignment aperture 38 of holder 12. Then, holder 12, together with its grid frame 41' with the strand conductors therein is rotated 180 degrees counterclockwise, as viewed in FIG. 1, and brought to rest with its grid frame 41' in registry with grid frame 41 on backplate 23 of holder 11. In this position grid frame 41' is placed on top of grid frame 41 in stacked registry therewith so that alignment pins 26 and 54 on backplates 23 and 23' will pass through grid frames 41 and 41' to engage alignment apertures 55 and 29, respectively, and alignment pins 80 and 82 will engage alignment apertures 81 and 83. In this position the holders 11 and 12 and grid inserts 41 and 41' take up the configuration of FIG. 3 with each grid and plane of the 13 conductor strands in each grid frame being closely adjacent and parallel to each other. However, the alignment pins and alignment apertures, as described, or the grooves 52, 52', 53 and 53' are positioned so that a longitudinal conductor strand in one grid is in one frame 41' not directly opposite a longitudinal strand of the other grid in frame 41, but occupies a position intermediate a pair of longitudinal strands in grid frame 41. Pins 26 and 54 on backplates 23 and 23' respectively, are longer pins which extend through alignment apertures 47 and 49' of grid frames 41 and 41' When the frames 41 and 41' are placed in stacked registry as described the pins 26 and 54 extend through frames 41 and 41' and into alignment apertures 55 and 29 in the faces 25' and 25 of backplates 23' and 23.

In the position of the strand grids as described, the tool of this invention is adapted to shear each grid of conductors to provide a smooth linear edge of equal length conductor strands, as well as to affix the conductor strands in a grid in their grid relationship so that a grid of conductor strands may be removed from its grid frame as a unitary and integral assembly of conductor strands.

Figure 4:
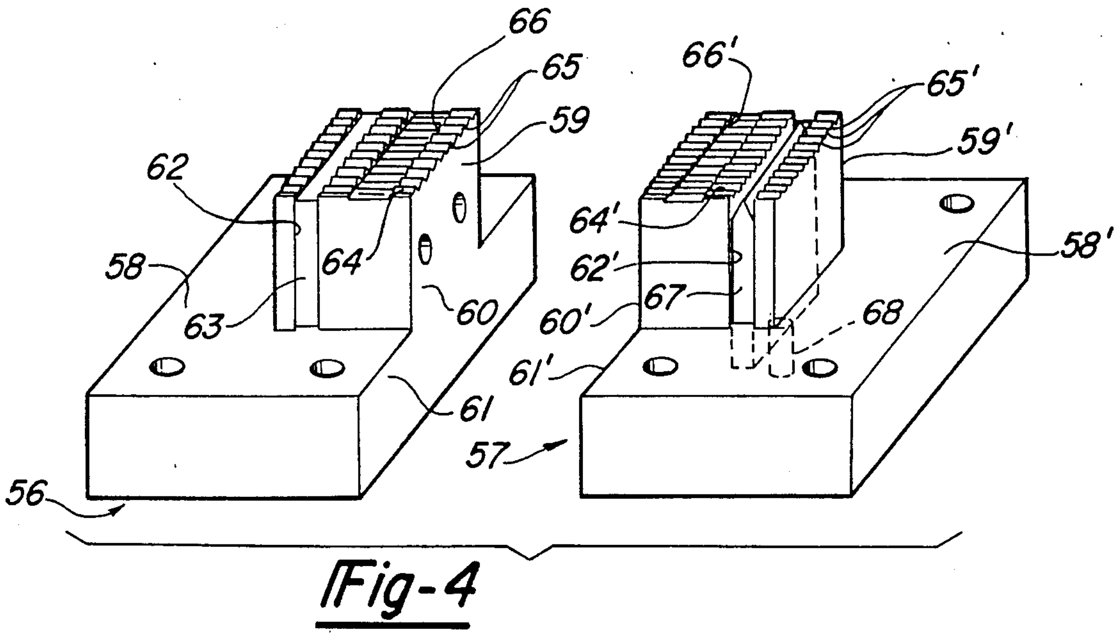
FIG. 4 is an illustration of a pair of particular anvil members for use with the tool of this invention.

Shearing and affixation are accomplished by means of special anvil members 56 and 57 as illustrated in FIG. 4.

Referring now to FIG. 4 anvil member 56 comprises a base plate 58 with a rectangular anvil head 59 thereon. One face 60 of anvil head 59 is coplanar with one face 61 of rectangular baseplate 58. A kerf slot 62 in head 59 contains therein a plate 63 of a soft metal or resin material. The rectangular face surface 64 of anvil head 59 contains a plurality of closely spaced side by side parallel grooves 65, for example 26 grooves. Grooves 65 form a spaced planar array or grid of grooves in the face surface 64. The kerf-like slot 62 is spaced nearer one side of anvil head 59 so that the grooves 65 on one side of kerf 62 are longer than the grooves on the opposite side of kerf 62. As illustrated in FIG. 4, anvil face surface 64 contains a shallow rectangular channel 66 therein which extends transversely across the grooves 65 and from one side to an opposite side of rectangular face surface 64. Channel 66 is parallel to and spaced from kerf slot 63 and from coplanar side 60 of anvil head 59.

Anvil 57 is structurally similar to anvil 56 and includes a baseplate 58' with an anvil head 59' thereon. The face surface 64' of anvil 57 also includes a planar array of closely spaced parallel grooves 65'. Anvil head 59' also includes a kerf-like slot 62' therein similar in size and arrangement and location as kerf slot 62 in anvil 56. In the same manner as with face surface 64 of anvil 56, the face surface 64' of anvil 57 includes a wide, shallow rectangular channel 66' extending across face 64 and perpendicular to the grooves 65' therein.

The depth of grooves 65 and 65' of faces 64 and 64' of anvils 56 and 57 is less than the diameter of a conductor strand 51, and channels 66 and 66' of faces 64 and 64' have a depth somewhat less than the depth of the grooves in these faces. The channels 66 and 66' therefore do not completely eliminate the grooves over which they extend.

Residing in sliding relationship in kerf slot 62' of anvil 57 is a rectangular cutter blade 67 whose straight cutting edge 69 lies transversely across the base of the grooves 65' in anvil face 66'. Cutter blade 67 is adapted to be moved perpendicularly towards and away from grooves 65', and to pass thereby, by means of a sliding pin 68 (see FIG. 3) which bears against the base of cutter blade 67. Back surfaces 60' and 61' of block 59' and base 58', respectively, are coplanar as are surfaces 60 and 61 of block 59 and base 58, respectively.

Figure 3:
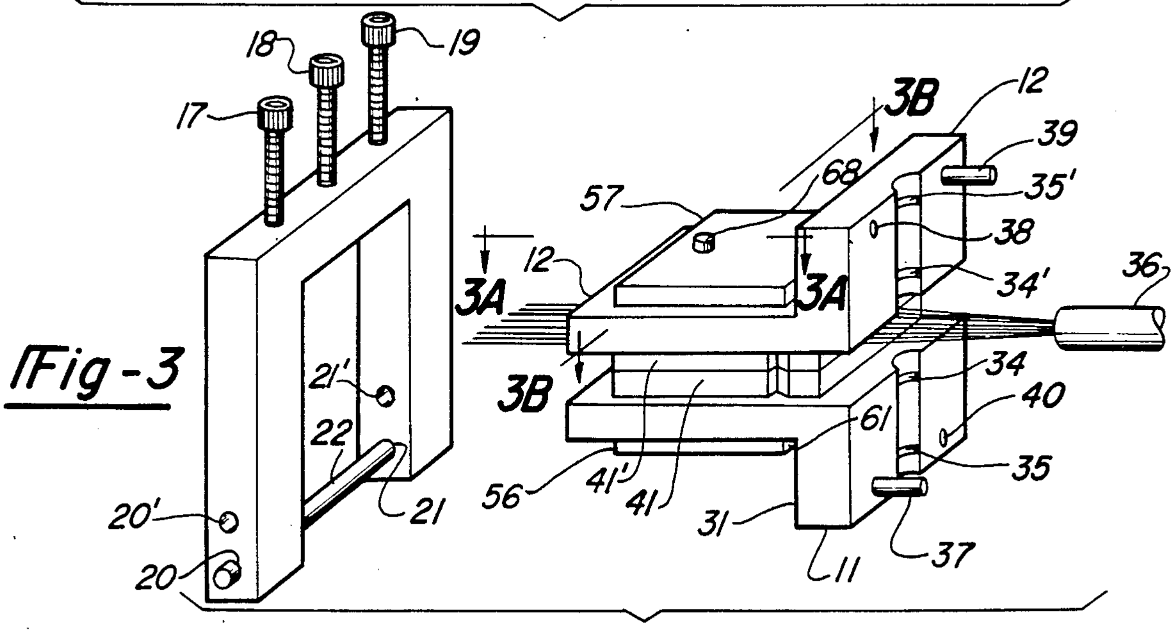
FIG. 3 is an illustration of the pair of holders and frames of FIG. 2 brought into stacked relationship with each other for a further tool operation.

Anvils 56 and 57 are inserted in clamp 10 after holder 12 has been released from clamp 10 and placed on holder 11 as has been described. The stacked relationship of holders 11 and 12, grid frames 41 and 41' and anvils 56 and 57 is shown in FIG. 3. In FIG. 3, for purposes of clarity and ease of understanding cable 36 is shown in a horizontal position as compared to the vertical position illustrated in FIG. 1 and FIG. 2.

Referring now to FIG. 3, when holder 12 is stacked on holder 11 in the position as shown, the grid of conductors 51' in grid frame 41' is adjacent the grid of conductors 51 in grid frame 41. These grids are visually exposed through rectangular apertures 30 in backplates 23 and 23' of holders 11 and 12. An anvil such as anvil 56 is placed in holder 11 as illustrated in FIG. 3 with its anvil head 59 closely inserted into aperture 30 of holder 11 as well as aperture 46 of grid frame 41. The coplanar surfaces 60 and 61 of anvil 57 lie closely adjacent inner surface 31 of footplate 24 of holder 11. The described arrangement is shown in FIG. 3. The grids or conductor strands in grid frames 41 and 41' may be observed through aperture 30' in backplate 23'. Accordingly the operator procures a short length of pressure sensitive tape and places it into aperture 30' and across the closest grid of conductors 51' in the grid frame 41' which as illustrated in FIG. 3, is next adjacent holder 12 and aperture 30' therein. The strip of tape is placed on the closest grid of conductor strands which would be strands 51' in grid frame 41' and preferably is in alignment with the shallow groove 66 in face 64 of anvil 56.

At this point anvil 57 is inserted in holder 12 in a similar manner and the stacked relationship of holder, grid frames, and anvils is illustrated in FIG. 3. The assembly of FIG. 3 is inserted within clamp 10 as shown by the dash lines in FIG. 3 and rotation of screws 17 and 19 force the disclosed assembly against pin 22 and anvils 56 and 57 towards each other. The grids of conductor strands 51 and 51' in grid frames 41 and 41' will be positioned between and be engaged by anvil faces 64 and 64' of anvils 56 and 57, respectively.

Figure 3A:
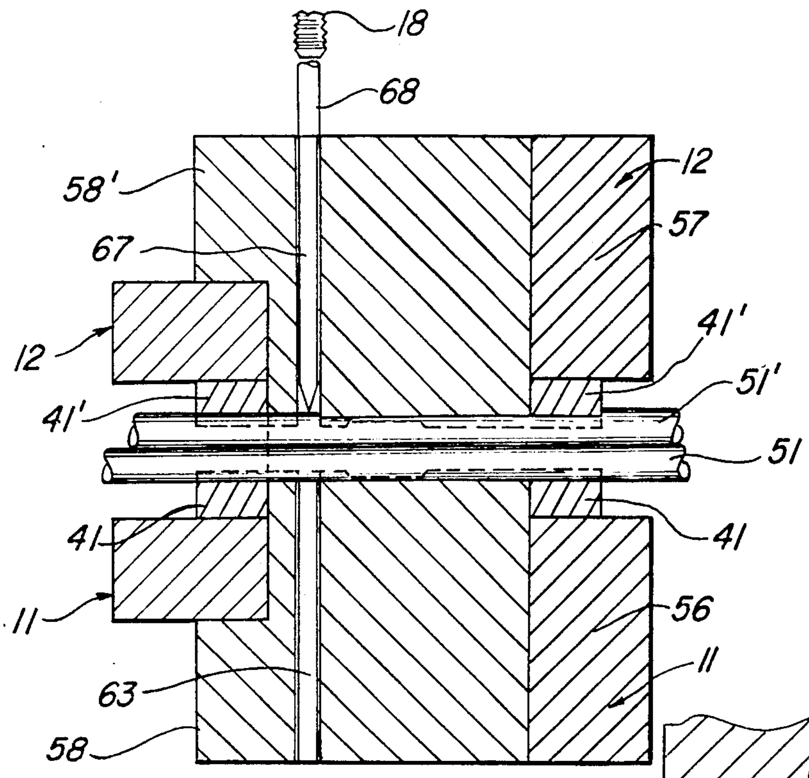
FIG. 3A is a cross-sectional view taken along the line AA of FIG. 3.
Figure 3B:
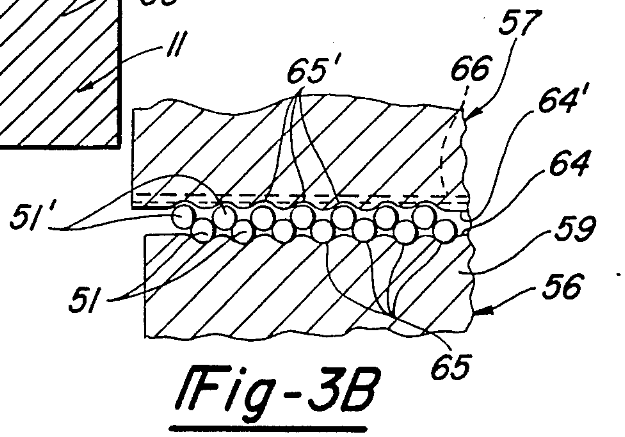
FIG. 3B is a cross-sectional view taken along the line BB of FIG. 3.

As illustrated in FIG. 3B the face 64 of anvil 56 includes closely spaced, parallel grooves 65 therein. Face 64' of anvil 57 has similar grooves 65'. In the assembled relationship the grooves in each anvil are in axial alignment with the conductor strands in the grid frames 41 and 41'. As previously described the grid of conductor strands in grid frame 41' are laterally offset with respect to the conductor strands in grid frame 41. FIG. 3B illustrates this offset relationship. Offsetting may be accomplished by offsetting the grooves in frames 41 and 41' or by predetermining the position of alignment pins and alignment apertures in the holders and grid frames with careful attention to the location of apertures 30 and 30' in holders 11 and 12 and 46 and 46' in grid frames 41 and 41' and the size and location of anvil heads 59 and 59' of anvils 56 and 57.

As illustrated in FIG. 3B further rotation of screws 17 and 19 forces conductor strands 51' between strands 51 so that the 13 conductor strands 51' lie parallel and alternate with conductor strands 51 to form a single grid of 26 strands between anvil faces 64 and 64'. At the same time the strip of pressure sensitive tape is pressed into firm engagement with the 26 conductor strands, and because of the curvature of the grooves, the tape partly encircles each strand firmly bonding each strand to the tape and to each other in a grid formation. Channels 66 and 66' in faces 64 and 64' of anvils 56 and 57 provide stress relief for the tape. By shearing the strands to have a smooth right angled cut and removing the strands as an integral unitary grid, a flat cable facsimile is provided.

A smooth right angled cutoff of conductor strands is accomplished by the cutter blade 67 in anvil 57 and cutter block 63 of anvil 56.

When anvils 56 and 57 are assembled as shown in FIG. 3, the cutter blade edge 69 is aligned with cutter block 63, and cutter blade pin 68 is directly under screw 18 in clamp 10. Such an arrangement is shown in FIG. 3A which is a view taken in plane AA of FIG. 3.

As illustrated in FIG. 3A anvils 56 and 57 are inserted into grid frames 41 and 41' which are in stacked relationship on each other. Anvil faces 64 and 64' of anvils 56 and 57 respectively are in opposed relationship to each other with the grids of conductors 51 and 51' therebetween. Channels 66 and 66' in anvils 56 and 57 are shown in their operative position. When the tool of this invention is assembled as described herein and illustrated in FIGS. 3, 3A and 3B kerf slots 62 and 62' are in alignment with each other and cutter block 63 of anvil 56 is directly in line with cutter blade 67 of anvil 57. At the same time sliding cutter blade pin 68 of FIG. 3 is adjacent to and in alignment with screw 18 of clamp 10.

As illustrated in FIG. 3A, rotation of screw 18 causes screw 18 to bear against pin 68 and to move pin 68 together with cutter blade 67 perpendicularly against conductors 51 and 51' in the grids in frames 41 and 41'. Cutter blade 67 shears off conductors in a grid in a smooth, clean, right angled linear cut.

After the tape pressing and cutting operation, screws 17, 18 and 19 on clamp 10 are loosened and the assembly of FIG. 3 is removed from clamp 10. The assembly comprising anvils 57 and 58, holders 11 and 12, and grid frames 41 and 41' may then be dismantled and the resulting coplanar grid of conductor strands removed.

Alternatively, after the adhesive tape application and conductor shearing operation, the operator could simply release pressure from clamp 10 on the assembly of FIG. 3 and, with a levering tool such as a common screwdriver, rupture or crack the grid frames at the reduced cross sections between scoring grooves 69 and 70 and 71 and 72 (See FIG. 2). This cracking operation is facilitated by manufacturing grid frames 41 and 41' from a frangible material such as a molded resin composition or a zinc alloy. By cracking the grid frames, the operator is able to easily remove the electrical cable from the tool assembly while maintaining the tool as a unitary structure, thereby facilitating its handling. With the frames broken, the grid of conductor strands is readily removed from the tool as an integral unitary grid of closely spaced side by side parallel conductor strands which are securely bonded to the tape and to each other. Accordingly, this grid end of conductor strands extending from a round cable 36 is similar to a flat electrical cable and may be treated as a flat cable for appropriate termination in available flat cable termination tools and connectors. By appropriate selection of grid frames and grooves a round cable may be adapted to various predetermined flat cable configurations.

A unique advantage of the practice of this invention is that round cables may be installed and then quickly adapted for flat cable termination and the actual termination can then be delayed for another time while other scheduled work can be undertaken. There is minimum interference with other work schedules.

While a preferred embodiment of this invention has been illustrated and described, it will be obvious to those skilled in the art that various changes and modifications may be made therein without departing from the scope of the invention as defined by the appended claims.

What is claimed is:

1. A tool effective to adapt an end of a round electrical cable having a plurality of individual conductor strands to a flat electrical cable for termination thereof comprising in combination:

(a) clamping means to clamp and retain a round electrical cable therein, (b) a pair of grid frame means to support a plurality of said individual conductor strands in each frame means in a grid configuration with each grid comprising a series of closely spaced side by side parallel conductor strands, (c) holder means in said clamping means to support said pair of grid frame means in closely spaced parallel relationship with the conductor strands of one grid offset from and parallel to adjacent strands in the other grid, (d) anvil means in said clamping means, said anvil means oppositely abutting said grids and operative to press said grids towards each other to press the strands of the one grid between the strands of the other grid so that a single planar grid is defined in which all strands are coplanar, (e) means on said clamping means to remove said single grid from said clamping means as an integral unitary grid comprising an elongated flat section of closely spaced side by side parallel conductor strands capable of being treated as a flat electrical cable.

2. The invention as recited in claim 1 further comprising bonding means on said single grid bonded to said strands to retain said strands in their grid relationship.

3. The invention as recited in claim 2 wherein shearing means in said clamping means is operable to shear the strands in said single grid adjacent said bonding means and transversely across the grid to provide a smooth linear transverse cutoff for the strands in said grid.

4. The invention as recited in claim 3 wherein said shearing means comprises a cutting blade positioned within said anvil means, said cutting blade being operative in a reciprocating manner to shear the strands in said single grid.

5. The invention as recited in claim 3 wherein the number of individual conductor strands in said flat section is equal to the number of individual conductor strands in said cable.

6. The invention as recited in claim 3 wherein holder means is clamped in said clamping means to hold said grids in their closely spaced parallel position.

7. A tool for adapting an end of a round electrical cable having a plurality of individual conductor strands to an elongated flat configuration with said conductor strands in closely spaced side-by-side parallel relation for termination comprising:

(a) a repositionable clamp;

(b) two repositionable L-shaped holders, each holder having a sole surface on a short leg and a face surface on a long leg, said face surface being substantially perpendicular to said sole surface, each sole surface having a substantially semicircular-shaped channel therein for receiving said round electrical cable, said clamp being used to retain said sole surfaces in opposed relation about said round electrical cable so that the cable is secured between said surfaces and the face surfaces of said holders extend on opposite sides of said cable;

(c) two grid frames, each grid frame being located on a respective face surface of each of said holders, said grid frames each having a plurality of individual conductor strand receiving grooves therein for supporting conductor strands in a grid with each grid comprising a series of closely spaced side-by-side parallel conductor strands, said conductor strands being individually positioned within said receiving grooves while said cable is clamped within said channels after which said clamp is removed and said face surfaces with said grid frames thereon are stacked in opposed relation;

(d) two movable anvils for oppositely abutting said grids and pressing in conjunction with said clamp said grids towards each other sufficiently to position the strands of one grid between the strands of the other grid so that a single grid is defined in which all strands are coplanar;

(e) bonding means for retaining said strands in said coplanar grid relationship;

(f) shearing means located in one of said anvils for shearing the strands in said single coplanar grid adjacent said bonding means and transversely across said coplanar grid to provide a smooth linear transverse cut off of the strands in said coplanar grid; and (g) means for removing said coplanar grid from said grid frames as an integral unitary grid comprising an elongated flat section of closely spaced side-by-side parallel conductor strands capable of being terminated as a flat electrical cable.

8. A grid frame for use in a tool capable of adapting an end of a round electrical cable having a plurality of individual conductor strands to an elongated flat configuration with said conductor strands in closely spaced side-by-side parallel relation for termination, comprising:

a pair of spaced end arms, each end arm having a face surface with a plurality of closely spaced side-by-side parallel grooves therein, each groove in one end arm being directly opposite and coaxial with a groove in the second end arm so as to define a set of coaxial grooves, each set of coaxial grooves being capable of retaining an individual conductor strand; and a pair of spaced side arms, each side arm being secured to each end arm, said pair of spaced end arms with said pair of spaced side arms secured thereto defining a central opening, whereby individual conductor strands may be positioned within said sets of coaxial grooves and thereby extend across said central opening as a single grid.

9. The invention as recited in claim 8, wherein each of said side arms has a face surface, said side arm face surfaces and said end arm face surfaces defining a common face plane.

10. The invention as recited in claim 9, in combination with a second, identical grid frame, approximately half of said plurality of individual conductor strands being positionable within said sets of coaxial grooves in one grid frame, the remaining individual conductor strands being positionable within said sets of coaxial grooves in the second grid frame, the face plane of one grid frame being matably engageable with the face plane of the second grid frame such that when said conductor strands are positioned in said sets of grooves and said grid frames are stacked with their face planes in matable engagement said single grids of conductor strands within each frame are pressed together to form one coplanar grid of strands.

11. The invention as recited in claim 10, wherein one grid frame has a first alignment pin and a first alignment aperture and the second grid frame has a second alignment aperture and a second alignment pin, said first alignment pin being constructed to retainably engage said second alignment aperture and said second alignment pin being constructed to retainably engage said first alignment aperture when said face planes of said grid frames are in matable engagement.

12. The invention as recited in claim 8, wherein said pair of spaced end arms with said pair of spaced side arms secured threto compries a unitary member.

13. The invention as recited in claim 12, wherein said unitary member is manufactured from a readily frangible material so that said member can be broken away from said conductor strands after alignment and bonding of said strands.

14. The invention as recited in claim 13, wherein said unitary member has at least one scoring groove therein for facilitating the breaking away of said member from said strands.

15. The invention as recited in claim 14, wherein said unitary member and said central opening are both rectangular-shaped.

16. The invention as recited in claim 15, wherein said unitary member is manufactured of a molded resin composition.

17. The invention as recited in claim 15, wherein said unitary member is manufactured from a zinc alloy.

18. A method of adapting an enclosed multi-strand round electrical cable to an electrical flat cable configuration for termination as a flat cable comprising:

(a) exposing a length of the multi-strands in said round cable at one end thereof, (b) fixing a plurality of said strands on one of a pair of frames as a grid of an extended array of closely spaced side by side parallel strands which extend from said cable and lie in closely fitting grooves on said frame, (c) fixing a further plurality of said strands on the other of said pair of frames in the same manner, (d) placing said frames in stacked relationship on each other so that the grids of conductors thereon are (1) in planar abutting relationship with each other and (2) the strands of one grid lie between adjacent strands of the other grid, (e) placing a strip of an adhesive tape transversely across the conductor strands in one of said grids, (f) moving the strands of one of said grids to between adjacent strands of the other grid to lie coplanar therewith in a single grid comprising all strands of both grids and simultaneously pressing the adhesive tape firmly into bonding engagement with all conductor strands in the single grid, (g) shearing all strands in the single grid to provide a smooth transverse cut end of equal length strands, (h) removing the single grid of conductor strands from said frames as an integral unitary grid of closely spaced side by side parallel strands bonded by said adhesive tape and extending from said cable.

19. A method of using a hand tool to adapt an enclosed multi-strand round electrical cable to a flat cable configuration for termination as a flat cable comprising:

(a) clamping said cable in a hand tool, (b) exposing a length of the multi-strands in said round cable at one end thereof, (c) fixing a plurality of said strands on one of a pair of open rectangular frames as a grid of an extended array of closely spaced side by side parallel strands which extend from said cable and lie in closely fitting grooves on said frame, (d) fixing a further plurality of said strands on the other of said pair of frames in the same manner, (e) placing said frames in stacked relationship on each other so that the grids of conductors thereon are (1) in planar abutting relationship with each other and (2) the strands of one grid lie between adjacent strands of the other grid, (f) placing a strip of an adhesive tape transversely across the conductor strands in one of said grids, (g) positioning said frames between opposed anvils so that opposing faces of said anvils abut said grids in said frames and said tape, (h) moving said anvils towards each other to (1) move the strands of one of said grids to between adjacent strands of the other grid to lie coplanar therewith in a single grid comprising all strands of both grids and (2) press the adhesive tape firmly into bonding engagement with all conductor strands in the single grid, (i) shearing all strands in the single grid along a line transverse to said strands and parallel to and spaced from said adhesive strip, (j) removing said single grid from said frames as an integral unitary grid of closely spaced side by side parallel strands bonded by said adhesive tape and extending from said cable.

20. The method of claim 19 including terminating said unitary grid as a flat electrical cable in a flat electrical cable connector.

* * * * *